United States Patent [19]

Wei

[11] 4,226,942
[45] Oct. 7, 1980

[54] FOAMABLE RESINS PROCESS
[75] Inventor: Nan Wei, West Springfield, Mass.
[73] Assignee: Monsanto Company, St. Louis, Mo.
[21] Appl. No.: 934,134
[22] Filed: Aug. 15, 1978
[51] Int. Cl.$^2$ ............................. C08J 9/18; C08J 9/20; C08J 9/22
[52] U.S. Cl. ....................................... 521/56; 521/60; 521/918
[58] Field of Search .................................. 521/56, 60
[56] References Cited
U.S. PATENT DOCUMENTS

| | | | |
|---|---|---|---|
| 3,577,360 | 5/1971 | Immel | 521/56 |
| 3,835,073 | 9/1974 | Thimas | 521/56 |

Primary Examiner—Morton Foelak
Attorney, Agent, or Firm—Joseph S. Nelson; William J. Farrington; Edward P. Grattan

[57] ABSTRACT

This invention relates to an improved process for the production of a particulate foamable polyvinyl aromatic resin of the type wherein a vinyl aromatic monomer is polymerized in an aqueous suspension system to produce beads of thermoplastic polyvinyl aromatic resin, separating the beads and incorporating a volatile liquid blowing agent in the separated beads at a temperature above the resin softening point under such conditions that foamable resin particles are produced, cooling said beads followed by separating and drying said beads, the improvement comprising: drying said beads under vacuum conditions at normal temperatures, removing residual water from said beads while retaining said blowing agent in said beads. Also included in the invention are foamable particles when produced by the above process and foamed articles made from the foamable particles.

26 Claims, No Drawings

FOAMABLE RESINS PROCESS

BACKGROUND OF THE INVENTION

This invention relates to the production of foamable resins, and particularly to a process for the production of foamable vinyl aromatic polymer particles as well as to foamed articles made from them.

Foamable polyvinyl aromatic resin particles, for instance beads, are an important industrial commodity. For example, foamable polystyrene beads produced by polymerizing styrene in an aqueous suspension system in the present of a volatile hydrocarbon blowing agent are commonly used in the production of foamed polystyrene by a process in which they are expanded by the action of heat so as to produce a "prefoam" of foamed beads and these foamed beads are placed in a suitable mold and heated by steam in a molding operation. Here, further expansion and consolidation of the beads takes place and an article conforming to the shape of the mold is produced.

It has been found that the best results are obtained when the beads used to make an article are all of approximately the same size and that difference sizes of bead are required for different classes of article. Thus, relatively large beads are usually best for making blocks intended to be cut up into sheets for insulation purposes, somewhat smaller beads are usually employed for making ceiling tiles, smaller ones still for making packages for electronic or other delicate equipment and the smallest useful size of beads is usually employed for making disposable drinking cups or other small containers. It is, therefore, often found that there is a greater demand for one size of bead than for another and this requires elaborate control of the suspension polymerization process by which the beads are made so as to produce the different sizes in the required proportion. It may even be necessary to discard some beads for which no market exists and such waste is economically undesirable. Moreover, sieving the foamable beads to separate the different grades can in some way result in a tendency for the "prefoamed" beads to clump together in the prefoaming apparatus and block it and special measures are needed to counteract this tendency.

More recently processes have been developed to produce foamable beads by impregnating or incorporating the blowing agent in the beads after they are polymerized by suspending the beads in an aqueous suspension and incorporating the blowing agent into the beads under pressure following by cooling and drying the beads so as to remove residual surface and occluded water under conditions that will remove the residual water without removing the volatile blowing agents. Here, both processes, i.e., the polymerizing of beads in the presence of the blowing agent or impregnating the beads after polymerization have the same problem of economically drying such foamable beads so as to remove the residual water yet retaining substantially all of the incorporated blowing agent.

Conventionally such foamable beads have been separated by centrifuging the beads or screening the beads from the aqueous suspension medium. Centrifuged beads typically contain about 1% residual water and about 7% blowing agent, e.g pentane. The beads are air dried to remove surface water and occluded water. The beads are conventionally dried in a continuous rotary air drier at temperatures of about 120° to 125° F. (49° to 52° C.) as disclosed in U.S. Pat. No. 3,060,138.

It has been discovered that such foamable beads can be dried removing residual water under vacuum conditions at normal temperatures in relatively short time periods, e.g. ten to twenty minutes yet retaining substantially all the volatile blowing agent incorporated in the bead. This ability of this process to remove residual water at high rates without drastically reducing the blowing agent content was totally unexpected considering the volatility of the blowing agents. Beyond the superior drying rates the process provides a dried foamable bead that has a superior fine cell structure not attainable with conventional drying.

SUMMARY OF THE INVENTION

A process for the production of foamable polyvinyl aromatic resin beads, the steps comprising:
(a) polymerizing a vinyl aromatic monomer in a first aqueous suspension system forming polymeric beads of said monomer,
(b) separating the beads from the first aqueous suspension,
(c) suspending the separated beads under agitation in a second aqueous suspension system,
(d) incorporating a volatile liquid blowing agent into the beads at a temperature above the softening temperature of the beads under superatmospheric pressure in a closed vessel,
(e) cooling the second aqueous suspension under superatmospheric pressure until the suspended beads have cooled sufficiently to render the beads non-foaming at atmospheric pressures,
(f) recovering the beads from the aqueous suspension,
(g) drying the beads forming free flowing foamable polyvinyl aromatic polymeric beads having 1–15% of said volatile liquid blowing agent incorporated in the beads, the improvement comprising: drying said beads under vacuum conditions at normal temperatures, removing residual water from said beads while retaining said blowing agent in said beads.

The vinyl aromatic monomer is one whose polymer is desired to be foamable and to which aqueous suspension techniques are applicable, that is to say one that is both liquid and substantially immiscible with water under the polymerization conditions. Examples of such monomers are styrene, a halostyrene such as p-chlorostyrene and an alkyl styrene such as α-methylstyrene or vinyltoluene. Excellent results have been obtained using styrene. Copolymers of two or more of such monomers or of a vinyl aromatic monomer and another monomer for instance acrylonitrile, methacrylonitrile, methyl methacrylate or butadiene can be produced.

Polymerization of the vinyl aromatic monomer can be effected by an ordinary aqueous suspension technique such as disclosed in U.S. Pat. No. 3,051,682. It is usual to employ a suspending agent and an initiator, such as peroxide, and to carry out the polymerization at a suitably elevated temperature with agitation of the aqueous system being necessary under pressure. After the polymerization reaction has been completed, the beads are separated from the aqueous medium by filtration or by means of a centrifuge, or simply by allowing them to settle and decanting the aqueous medium. They can, if desired, be washed and dried before being subjected to size separation.

Preferably, the blowing agent to be incorporated in the beads is a lower liquid aliphatic hydrocarbon, for instance pentane, isopentane, butane, hexane, or a mixture of hydrocarbons containing mostly from 5 to 7 carbon atoms called petroleum ether. Preferably, pentanes predominate in such a mixture. A small amount of butane may also be present in solution in the liquid blowing agent. From 1 to 15% and preferably from 4 to 10% by weight of the blowing agent based on the weight of resin is usually a sufficient proportion to incorporate in the beads.

Incorporation of the volatile liquid blowing agent in the beads is as has been stated preferably performed under such conditions that the desired range of particle sizes is substantially preserved. Because the temperature is above the resin softening point the articles should therefore as far as possible be kept separate from one another or they would stick together. A convenient method of achieving this end is to suspend the particles in a liquid medium, preferably aqueous, in which they are substantially insoluble. Where an aqueous suspension medium is employed, this can be similar to that used in the earlier polymerization step and is preferably includes a suspending agent. The weight of suspension medium is preferably from 0.8 to 15 times the weight of the resin beads. Various types of suspending agent can be used, including water soluble polymeric materials such as, for example, hydroxyethylcellulose, a copolymer of vinylpyrrolidone and methyl methacrylate, or preferably, a hydrolyzed or partially hydrolyzed polyvinyl acetate. A 70% to 85% hydrolyzed polyvinyl acetate gives very good results. An alternative type of suspending agent is a highly insoluble but water-dispersible inorganic substance such as, for example, calcium phosphate, magnesium sulfate, calcium carbonate, magnesium silicate, aluminum oxide, talc or kaolin. Preferably, also present in an aqueous suspension system is a wetting agent, which assists in keeping the liquid blowing agent dispersed in the system. Examples of suitable wetting agents include ionic ones such as sodium alkylsulphonates and sodium alkylbenzenesulphonates wherein the alkyl group contains ten to twenty carbon atoms, and more preferably, non-ionic ones such as $C_8$-$C_{20}$ alkylbis-(ethanol) amines, polyethyleneglycol and esters and ethers of polyethyleneglycol. A particularly preferred wetting agent is the octylphenoxypolyethoxyethanol (9-10 ethylene oxide units per molecule) sold by Rohm and Haas, Philadelphia, Pennsylvania under the Trademark "Triton X100". From 0.03 to 0.6% by weight, and preferably from 0.05 to 0.3% by weight, of the aqueous medium is normally a suitable proportion of a suspending agent of the water soluble polymeric type, while for an inorganic suspending agent from 0.1 to 2.0% by weight of the aqueous medium is preferred. Where a wetting agent is employed, it is preferably present in an amount from 0.02 to 2.0% by weight of the aqueous medium. If foaming of the suspension system occurs or evidence of emulsion losses occur, it has been found effective to add from about 0.001 to 0.5% by weight, basis on the aqueous phase, of an inorganic salt, e.g. sodium chloride, potassium chloride or calcium chloride which inhibits foam and emulsion formation.

As an alternative to an aqueous suspension system an organic one can be used, for example, one based on a lower alkanol such as methanol or ethanol. The blowing agent itself can be employed in large excess, for example, in a proportion 10 to 20 times the weight of resin beads, as a suspension medium.

Where a liquid suspension system is used, it is preferred to agitate it to assist in maintaining suspension of the beads, for example, by means of a stirrer, and although such agitation is normally required to be vigorous it should not be excessively so or the beads may be broken up into smaller ones and the desired range of particle sizes will not be obtained. It is not possible to give definite information on the degree of agitation required, because this is dependent on the size and shape of the vessel employed as well as the proportions of the resin beads, the liquid blowing agent, the suspension medium and the suspending and wetting agents. However, a few experiments will suffice to show whether the suspended beads are becoming agglomerated or are being broken up. A small degree of agglomeration, for example, of up to 1% of the beads, can occur in some instances, but this is tolerable because the resulting agglomerates are so few in number and so much larger than individual beads that they can be easily removed by passing the product through a coarse screen. Such screening does not apparently involve the physical damage that is believed to cause the prefoam sticking problem mentioned earlier. A slight overall change in the particle size range, which is more apparent than real, can occur in cases where the particles change their shape slightly (for example, they may become more truly spherical or less so) with a resultant difference between the results of size analyses carried out before and after the incorporation step. No screening is necessary to counteract this effect and it can be allowed for in choosing the particle size range of the selected beads.

The temperature at which the blowing agent is incorporated in the beads is above the Vicat softening point of the resin.

The blowing agent can have a plasticizing effect and thus lower the softening point of the resin, the softening point thus lowered is very difficult to measure accurately and it is accordingly intended for the purpose of clarity that in this specification the term "softening point" shall mean the softening point measured by the above test on the resin without the liquid blowing agent incorporated therein. Preferably, the temperature employed is from 5° to 55° C., above the resin softening point, and for example, in the case of polystyrene having a Vicat softening point of about 95° C. it is usually desirable to employ a temperature of from 100° to 150° C., preferably from 105° to 125° C. Preferably, the temperature is lower than the critical temperature of the blowing agent.

The operating temperature is also linked to the strength of whatever container is used to contain the resin and the blowing agent, because of the vapor pressure exerted by the blowing agent and any liquid suspension medium. For example, the pressure can be from about 4 to 15 kilograms per square centimeter gauge, and preferably is from 6 to 10 kilograms per square centimeter gauge.

The time required for incorporation of the blowing agent in the resin depends on several factors, including the mutual solubility of the resin and the blowing agent (preferably the blowing agent swells the resin but does not dissolve it). Other relevant factors are the amount of blowing agent to be incorporated, the diameter of the beads, and the temperature. Usually the time needed lies between 1 hour and 10 hours, and very often between 2.5 and 6 hours, and the optimum time is easily determined by a few experiments.

It is preferably to add the blowing agent gradually to the resin particles, for example, over a period of ½ hour to 4 hours, so as to avoid the formation of a distinct layer of the blowing agent which could cause excessive agglomeration of the particles. Preferably, addition of the blowing agent is not commenced until the resin beads have been heated to a temperature not lower than 40° C. below the resin softening point and is continued while heating to the operating temperature.

After incorporation of the blowing agent, the foamable particles are allowed to cool. If the incorporation is accomplished under pressure, the pressure needs to be maintained until the particles have cooled sufficiently to avoid foaming when the pressure is released. It is advantageous to carry out a part of this cooling as rapidly as possible because this can have the effect of reducing the time for which a foamed article molded from the beads has to be allowed to cool in the mold.

Additives such as, for example, a flame-retardant agent, a nucleating agent or a coloring agent can be incorporated in the beads at the same time as the blowing agent, or the foamable beads can be given a coating of such additives or of additives designed to enhance the degree to which the prefoamed beads fuse together in the mold or to reduce any tendency towards prefoam sticking.

The foaming and molding operations can follow ordinary practice; thus the foamable particles can for example be heated by steam, hot water or hot air, or under the influence of an infra-red heater, to produce foamed beads, and these are preferably conditioned by exposing them to the atmosphere for a day or two before they are used in the molding operation. A suitable mold is fully or partially filled with foamed beads and closed, and then steam is injected through inlets in the mold walls. When foaming is complete, the steam supply is shut off and the article is allowed to cool in the mold before the mold is opened.

EXAMPLE 1

Styrene was polymerized in an aqueous suspension to produce polystyrene beads of diameters ranging between 0.1 and 2.0 millimeters. The polymerization was conducted according to ordinary practice and no special procedures were used to control the sizes of the beads. The weight-average molecular weight of the polystyrene was 280,000, measured by gel-permeation chromotography.

The beads were sieved and a fraction having diameters between 0.8 and 1.7 millimeters was separated from the remainder. Of this fraction, two thirds were between 1.0 and 1.7 millimeter in diameter and one third between 0.8 and 1.0 millimeter.

100 parts of di-ionized water were charged to a pressure vessel of capacity 135 liters equipped with a heating and cooling jacket, a three-retreating-blade Pfaudler agitator and a baffle. 0.2 parts of 75% hydrolyzed polyvinyl acetate and 0.1 part of Triton X100 were added. (Triton X100 is a Trademark for a non-ionic organic detergent alkylphenylpolyethoxyethanol). The solution was heated to 75° C. with the agitator in operation at a tip speed of 332 cm/sec. and 100 parts of the separated fraction of polystyrene beads were added followed by 0.3 part of sodium chloride. The vessel was then sealed and agitation and heating were continued while 9.4 parts of n-pentane were pumped in at a uniform rate over a period of two hours. A temperature of 110° C. was reached 33 minutes after the commencement of pentane addition and this was maintained for a further 5 hours, 27 minutes. Jacket cooling was then commenced and when the temperature of the batch has falled to 76° C. there was pumped into the vessel 66 parts of water at 4° C. which resulted in a fall in temperature to 54° C. in 1.75 minutes. Jacket cooling was continued until the temperature of the suspension reached 35° C., then the vessel was emptied and the beads separated from the liquid by means of a centrifuge.

The centrifuged beads were found to contain about 7.13% pentane and about 0.78% of residual water. The beads were flash dried at about 50° C. through a tube drier to remove surface water and sparged with dry air (Dew Point 4° C.) at 35° C. for five hours to remove occluded water providing a foamable bead having about 0.15% water and about 6% pentane. The beads were foamed with steam for 10 minutes providing a foamed bead with a bulk density of about 16 kgs/m³ and a cell size of about 50 microns in diameter.

EXAMPLES 2–7

The centrifuged beads of Example 1 were dried in a laboratory vacuum oven in trays with beads in a layer of about 0.625 cm in depth simulating a rotary vacuum drying oven. The temperature and vacuum conditions were varied and the beads tested. Conditions and test results are shown in Table 1.

TABLE I

| Example | Temp. °C. | Vacuum in Hg.[3] | Time min. | % H$_2$O | % Pentane | Density[1] | Cell Size[2] |
|---|---|---|---|---|---|---|---|
| 2 | 22 | 15 (380) | 20 | .023 | 7.15 | .54 (8.6) | 25–35 |
| 3 | 22 | 15 (380) | 50 | .029 | 6.61 | .57 (9.1) | 25–35 |
| 4 | 22 | 29 (380) | 15 | .161 | 6.75 | .56 (8.9) | 25–35 |
| 5 | 22 | 29 (735) | 50 | .013 | 6.53 | .58 (9.3) | 25–50 |
| 6 | 30 | 29 (735) | 10 | .036 | 6.58 | .57 (9.1) | 25–50 |
| 7 | 30 | 29 (735) | 40 | .010 | 6.39 | .59 (9.4) | 25–50 |
| 8 | 15 29 (735) | 50 | .141 | 6.81 | .55 (8.7) | 25–35 | |
| 9 | 45 | 29 (735) | 10 | .015 | 6.25 | .58 (9.3) | 25–50 |

[1]Bulk density in pounds/cu.ft. (kgs/cm³)
[2]Diameter in microns
[3]Vacuum in inches and (mm) of Hg.

It is evident from the data that the beads are readily dried under a reasonable level of vacuum as used in rotary vacuum driers retaining substantially all of the blowing agent in the bead.

It is also evident that the beads can be dried at temperatures of about 15° to 45° C. which maintains the structure of the beads. Economically the process is highly desirable in that drying can be carried out in 10 to 20 minutes in a batch or flow-through vacuum drier increasing the yields of the present process and reducing the energy input to the process, i.e., it is more economical to use a vacuum process than an air sparging process with dry air.

The vacuum drier means can be a conventional vacuum drier that can operate as low as 5 mm of Hg pressure or 775 mm of Hg vacuum. These are conventionally batch driers with a stationary cylindrical shell mounted horizontally in which a set of spiral agitator blades mounted on a revolving central shaft stir the solids to be dried. Heat is supplied by jackets as necessary. The drier is charged through a top port and discharged through a bottom port. Vacuum is applied by any conventional means, i.e., steam jets, vacuum pumps, etc.

Other types, are the vacuum rotary drier or the double cone rotating vacuum drier. The Chemical Engineer's Handbook, Fifth Edition, McGraw-Hill Book Company, Pages 20-45 through 20-48 discloses in detail such conventional commercial vacuum drying systems and equipment.

In drying the wet foamable beads it has been found practical to dry with vacuums of 5 to 735 mm of Hg, with vacuums of 380 to 735 mm being preferred for time periods of 10 to 50 minutes at normal temperatures of 15° to 45° C., preferably 20° to 30° C., bringing the water content of the bead to about 0.01 to 0.15% by weight, said beads containing 1 to 15% by weight of blowing agent, said drying process substantially retaining the amount of blowing agent incorporated in the foamable beads.

What is claimed is:

1. In an improved process for the production of foamable polyvinyl aromatic resin beads, the steps comprising:
   (a) polymerizing a vinyl aromatic monomer in a first aqueous suspension system forming polymeric beads of said monomer,
   (b) separating the beads from the first aqueous suspension,
   (c) suspending the separated beads under agitation in a second aqueous suspension system,
   (d) incorporating a volatile liquid blowing agent into the beads at a temperature above the softening temperature of the beads under superatmospheric pressure in a closed vessel,
   (e) cooling the second aqueous suspension under superatmospheric pressure until the suspended beads have cooled sufficiently to render the beads non-foaming at atmospheric pressures,
   (f) recovering the beads from the aqueous suspension,
   (g) drying the beads forming free flowing foamable polyvinyl aromatic polymeric beads having 1-15% of said volatile liquid blowing agent incorporated in the beads, the improvement comprising: drying said beads under vacuum conditions at normal temperatures of about 15° to 45° C., removing residual water from said beads while retaining said blowing agent in said beads and maintaining the structure of said beads as foamable non-foamed beads recovered from step (f), said vacuum being 380 to 735 mm of Hg.

2. The process of claim 1 wherein the second aqueous suspension system has present about 0.03 to 0.6% by weight of a water-soluble polymeric suspending agent selected from the group consisting of hydroxyethylcellulose, vinylpyrrolidenemethylmethacrylate copolymer, partially hydrolyzed polyvinyl acetate and mixtures thereof.

3. The process of claim 2 wherein the water soluble polymeric suspending agent is a 70% to 85% hydrolyzed polyvinyl acetate.

4. The process of claim 1 wherein the second aqueous suspension system has present 0.02 to 2.0% by weight of a non-ionic wetting agent for dispersing the blowing agent selected from the group consisting of $C_8$-$C_{20}$ alkylbis-(ethanol) amines, polyethyleneglycol, esters and ethers of polyethylene glycol, octylphenylpolyethoxy-ethanol and mixtures thereof.

5. The process of claim 1 wherein the second aqueous suspending system has present 0.01 to 0.5% by weight based on the aqueous medium of an inorganic salt of the group consisting of sodium chloride, potassium chloride and calcium chloride or mixtures thereof.

6. The process of claim 1 wherein the blowing agent is pentane, isopentane, butane, mixed hydrocarbons having 5 to 7 carbon atoms or mixtures thereof being incorporated in the beads in from about 1 to 15% by weight of the beads.

7. The process of claim 9 wherein the blowing agent is a mixture of pentane and isopentane having at least about 50% pentane.

8. The process of claim 9 wherein the liquid volatile blowing agent is pentane.

9. The process of claim 1 wherein the blowing agent is incorporated in the beads in step (d) at temperatures of 5° to 55° C. above the softening temperature of the bead over a period of about 1-10 hours.

10. The process of claim 1 wherein the superatmospheric pressures of step (d) are from about 4 to 15 kilograms per square centimeter gauge.

11. The process of claim 1 wherein the polyvinyl aromatic resin in polystyrene, copolymers of styrene-acrylonitrile, alpha-methylstyrene, styrene-alpha methyl styrene, styrene-butadiene, styrene-butadiene-acrylonitrile or mixtures thereof.

12. The process of claim 1 wherein the polyvinyl aromatic resin is polystyrene.

13. The process according to claim 1 wherein the weight average molecular weight of the polystyrene, as determined by gel permeation chromatography is 180,000 to 300,000.

14. The process according to claim 1 wherein part at least of the cooling of the resin beads is carried out as rapidly as possible by the introduction of cold water into the suspension system.

15. The process of claim 1 wherein a bromophenyl alkenyl ether is incorporated into the beads with the blowing agent.

16. A process of claim 1 wherein said normal temperature is about 15° to 30° C.

17. A process of claim 1 wherein said vacuum drying is carried out with agitation of said beads.

18. A process of claim 1 wherein said beads are recovered in step (f) under conditions such that said recovered beads have a residual water content of about 0.5 to 1.5% by weight.

19. A process of claim 18 wherein said beads are recovered by centrifuging.

20. A process of claim 1 wherein said vacuum drying is carried out such that the residual water content of said beads is about 0.01 to 0.15% by weight while substantially retaining the amount of blowing agent incorporated in step (d).

21. A process of claim 1 wherein said vacuum drying is carried out such that the residual water content of said beads is about 0.01 to 0.15% by weight and said beads contain about 1 to 15% by weight of blowing agent.

22. A process of claim 1 wherein said separating step (b) includes separating a fraction of said beads having a narrow range of bead sizes from said polymerized beads and suspending said fraction in said second aqueous suspension system.

23. The foamable polyvinyl aromatic resin particle produced by a process according to claim 1.

24. The foamed article made from the foamable polyvinyl aromatic resin particles of claim 1.

25. A process for separating a residual aqueous phase from foamable polyvinyl aromatic resin beads containing a volatile liquid blowing agent such that said blowing agent is retained in said beads, the steps comprising:
(a) charging said beads to a vacuum drying means,
(b) applying a vacuum to said beads at normal temperatures,
(c) separating said residual aqueous phase, while retaining said blowing agent in said beads, maintaining the structure of said beads as foamable, non-foamed beads, said vacuum being 380 to 735 mm. of Hg, said temperatures being 15° to 45° C., and
(d) recovering said foamable, non-foamed beads.

26. A process of claim 25 wherein said recovered beads in step (d) have a residual water content of about 0.01 to 0.15% by weight with said bead containing about 1 to 15% by weight of said blowing agent.

* * * * *